U̇nited States Patent Office 3,238,273
Patented Mar. 1, 1966

3,238,273
POLYURETHANES AND PROCESS FOR
PREPARING SAME
Horace N. Hampson and Robert John Turner, Egham,
England, assignors to Shell Oil Company, New York,
N.Y., a corporation of Delaware
No Drawing. Filed June 29, 1962, Ser. No. 206,206
Claims priority, application Great Britain, July 12, 1961,
25,233/61
13 Claims. (Cl. 260—830)

This invention relates to the preparation of resilient or elastomeric cellular materials. More particularly, the invention relates to the production of polyurethane resins and plastics.

Specifically, the invention provides a process for the production of a polyurethane resin which comprises reacting an organic polyisocyanate and/or polyisothiocyanate with a polyoxyalkylene polyol or a polyester having terminal hydroxyl groups in the presence of a modified glycidyl ether as hereinafter defined. The present invention also relates to polyurethane plastics obtained by reacting the polyurethane resins with an organic compound containing active hydrogen atoms or by reacting the organic polyisocyanate and/or polyisothiocyanate, polyoxyalkylene polyol or polyester, and modified glycidyl ether in the presence of a compound containing active hydrogen atoms. The present invention further relates to the polyurethane resins and plastics produced thereby.

Polyurethanes have been prepared in several forms. One form of the polyurethane is a polymeric material, often referred to for convenience as polyurethane "prepolymer," which is obtained by reacting an organic polyfunctional isocyanate or a polyfunctional isothiocyanate with an organic compound containing in the molecule a plurality of active hydrogen atoms (as determined by the Zerewitinoff method, J.A.C.S., vol. 49, page 3181, 1929), such as, for example, an organic polyhydroxy compound. While such prepolymers are in themselves useful polymeric materials, for example, prepolymers can be molded or cast into sheets or converted into synthetic rubbers, such prepolymers are at present particularly useful as intermediates for the production of another form of polyurethane, namely, a cross-linked polyurethane which for convenience of description is referred to herein as a polyurethane "plastic." Such polyurethane plastics can be prepared from prepolymers either (a) by reacting a prepolymer which contains free isocyanato or isothiocyanato radicals with a compound containing in the molecule a plurality of active hydrogen atoms or (b) by reacting with a polyisocyanate or a polyisothiocyanate, a prepolymer which contains active hydrogen atoms but which substantially does not contain free isocyanato or isothiocyanato radicals. In the second-mentioned case the prepolymer will usually contain active hydrogen atoms in the form of hydroxyl groups. The polyisocyanates and polyisothiocyanates referred to herein are organic compounds of the general formula $R(NCX)_{n+1}$, wherein R represents an organic radical, X represents an oxygen atom or a sulfur atom and $n$ is a positive integer.

It is also possible to prepare polyurethane plastics directly by reacting an organic polyisocyanate or polyisothiocyanate with an organic compound or compounds containing in the molecule a plurality of active hydrogen atoms under such conditions that the desired crosslinked polyurethane plastic is formed. This direct method of preparation is often referred to in the art as the single-stage or "one-shot" method, and from the manufacturing point of view it is often to be preferred to the two-stage method involving, as the first stage, the preparation of a prepolymer.

The polyurethane plastics are particularly useful when in the form of the cellular materials commonly known as polyurethane foams which, depending upon their physical properties, find particular application as insulating and shock-absorbing materials which may be used for many purposes in industry. Depending on the nature of the starting materials and the conditions under which the polyurethane foams are prepared it is possible to produce rigid foams suitable, for example, for heat insulation and resilient foams of various degrees of resilience suitable, for example, for shock absorption and for seat coverings, carpet underlays and many other purposes including, in the case of open-cell resilient foams, sound insulation. In general, polyurethane foams can be prepared by "blowing" the reaction mixture during the conversion of a prepolymer into a polyurethane plastic, or, in the case of the one-shot method, by blowing the reaction mixture in which the polyurethane plastic is produced directly from starting materials comprising a polyisocyanate or polyisothiocyanate and an organic compound having in the molecule a plurality of active hydrogen atoms. In either case blowing can be accomplished for example by such techniques as generating a gaseous blowing agent, e.g., carbon dioxide in situ in the reaction mixture or by supplying a gaseous blowing agent such as air thereto. In the case of the one-shot method, the reactants are usually mixed in a so-called mixing head fitted with a stirrer capable of rotation at speeds of the order of 2000 to 5000 r.p.m. In addition to promoting rapid and thorough mixing of the reactants the action of the stirrer also aids foam formation.

Theoretically at least the reaction which takes place during the formation of polyurethane resins by reacting an organic polyfunctional isocyanate or polyfunctional isothiocyanate with an organic compound containing a plurality of reactive hydrogen atoms is applicable to a large number of such organic compounds. On the other hand, however, the properties of the resulting polyurethane resins, and plastics prepared therefrom, depend to a large extent on the particular kind of organic compound used. It has been found that the organic compounds used have a marked effect on the properties of the polyurethane resins produced. Some organic compounds are better than others from the point of view of producing resins having more desirable physical properties, for example, color, thermal stability, moldability and, in the case of elastomeric products, resilience and deformation recovery. A particularly important application of polyurethanes is in the production of resilient cellular polyurethane plastics, and in this field of application a high degree of strength and an ability to recover quickly from deformation while at the same time having good resistance to fatigue, are desirable properties.

The polyurethane foams prepared as noted above, as by reacting organic polyisocyanates and polyisothiocyanates with polyols such as polyoxyalkylene polymers in the presence of a compound containing active hydrogen atoms are useful polymeric materials and have many desirable properties. These properties have been improved by using an alkylene oxide/alkylene polyol adduct as the polyol, such as for example, a propylene oxide/glycerol adduct that has been reacted with less than 10% by weight of ethylene oxide. Various other modifications have been proposed; however, there is still a need to produce rigid, semi-rigid and flexible polyurethane foams having surfaces that are less friable and which do not suffer from shrinkage. Also, in the one-stage production of such cellular polyurethane plastics there is a need to improve the dispersion of the starting materials, accelerate the reaction in some cases, as well as to produce plastics have high load bearing properties, good shock absorbing characteristics, good moldability as well as good bottom mold release properties.

It has been found, in accordance with the present invention, that polyurethane resins and plastics prepared as hereinafter described have the above-noted improved properties.

It is, therefore, an object of the present invention to provide improved polyurethane resins and plastics, particularly cellular foams. It is another object of the present invention to provide polyurethane resins and plastics having improved load bearing properties, shock absorbing characteristics, good moldabality, and excellent bottom mold release properties. It is still another object to provide polyurethane resins and plastics which are less friable and do not suffer from shrinkage, particularly when molded. It is still another object to provide polyurethane resins and plastics which have a high degree of strength, good deformation recovery and good resistance to fatigue. It is a further object to provide a process for preparing polyurethane resins and plastics wherein the dispersion of the starting materials is improved as well as accelerating the reaction. It is still a further object to provide a process for preparing polyurethane resins and plastics having improved load bearing properties, improved shock absorbing characteristics, good moldability, excellent bottom mold release properties; high degree of strength and good resistance to fatigue. These and other objects of the invention will be apparent from the following detailed description thereof.

It has now been discovered that these and other objects may be accomplished by polyurethane resins comprising the reaction product of an organic polyisocyanate and/or polyisothiocyanate with a polyoxyalkylene polyol or a polyester having terminal hydroxyl groups in the presence of an adduct of a glycidyl ether and a primary or secondary amine.

These and other objects may be further accomplished by polyurethane plastics comprising the reaction product of the above-described polyurethane resin containing free isocyanato or isothiocyanato groups with a compound containing active hydrogen atoms.

Accordingly, the present invention also includes, besides the above-described two-stage preparation of polyurethane plastics, the so-called "one-shot" technique comprising reacting an organic polyisocyanate and/or polyisothiocyanate with a polyoxyalkylene polyol or a polyester having terminal hydroxyl groups in the presence of a compound containing active hydrogen atoms and an adduct of a glycidyl ether and a primary or secondary amine.

It has now been found that the polyurethane resins and plastics of the present invention have improved load bearing properties and excellent shock absorbing characteristics as well as good moldability and mold releasing properties.

It has also been discovered that improved dispersion of the starting materials and faster reaction rates are achieved by the process of the present invention.

If desired, the process for the production of the polyurethane resin may be performed under substantially anhydrous conditions; that is, the water content of the reaction mixture is not more than 0.1% by weight based on the weight of the reaction mixture. If the water content of the reaction mixture is greater than 0.1% by weight based on the weight of the reaction mixture, the polyurethane resin will contain branched chains.

If desired, the process for the production of polyurethane resin may also be performed so that the ratio of total isocyanato or isothiocyanato groups to total hydroxyl groups present in the reaction mixture is substantially equal to or greater than 1:1; for example, 0.9:1.0 to 2:1 or greater. When the polyurethane resins are intended for the production of polyurethane plastics, said ratio may be such that the resultant polyurethane resin contains free isocyanato or isothiocyanato groups that are capable of reacting with a compound containing active hydrogen atoms; or said ratio may be such that the resultant polyurethane resin contains free hydroxyl groups that are capable of reacting with an organic polyisocyanate or polyisothiocyanate to obtain a polyurethane resin containing either no or free isocyanato or isothiocyanato groups.

The organic polyisocyanate or polyisothiocyanate may be an aliphatic, cycloaliphatic or aromatic compound or a derivative thereof provided any such derivative contains no substituent which interferes with the reaction. Thus, if desired, it may be used in the form of a functional derivative containing "masked" or "blocked" isocyanato or isothiocyanato groups, free isocyanato or isothiocyanato groups being formed from "masked" or "blocked" groups by the action of heat. Examples of such functional derivatives include dissociable polymers such as dimers; dissociable addition products of organic polyisocyanates or polyisothiocyanates with phenol, and non-dissociable addition products of organic polyisocyanates or polyisothiocyanates with suitable aliphatic polyhydroxy compounds, such as, for example, dimethylol propane, trimethylol propane and glycerol. It should be noted that in the non-dissociable addition products certain free isocyanate or isothiocyanate groups are present, but they are sterically hindered to such a degree that they are substantially unreactive at ordinary room temperatures, though they can react at a useful rate if heat is applied. The dissociable polymers and dissociable and non-dissociable addition products can be useful in reducing toxicity risks.

Advantageously, a difunctional organic isocyanate is used. Examples of suitable isocyanates and isothiocyanates are polymethylene diisocyanates and diisothiocyanates, such as ethylene diisocyanate, trimethylene diisocyanate, tetramethylene diisocyanate and pentamethylene diisocyanate; and the corresponding diisothiocyanates, alkylene diisocyanates and diisothiocyanates, such as propylene-1,2-diisocyanate, butylene-1,2-diisocyanate, butylene-1,3-diisocyanate, butylene-2,3-diisocyanates, and butylene - 1,3 - diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene-1,3-diisocyanate, cyclohexylene-1,4-diisocyanate and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanates, 1-methyl-2,4-phenylene diisocyanate, naphthylene-1,4-diisocyanate, diphenylene-4,4'-diisocyanate or p-phenylene diisothiocyanate; aliphatic-aromatic diisocyanates or diisothiocyanates, such as xylylene-1,4-diisocyanates, xylylene-1,3-diisocyanate, 4,4'-diphenylenemethane diisocyanate, 4,4'-diphenylene-propane diisocyanate, xylylene-1,4-diisothiocyanate or durene diisocyanate. In fact, any polyisocyanate or polyisothiocyanate of the general formula $R(NCX)_{n+1}$, in which $n$ is any integer, X is oxygen or sulfur and R is a polyvalent organic radical may be employed, though aromatic diisocyanates, for example, a toluene diisocyanate or isomeric mixtures thereof are preferred.

The polyoxyalkylene polyol suitable for use in the present invention may be a reaction product obtained from one or more alkylene oxides, and a polyol, such as, for example, ethylene glycol, propylene glycol, butanediol, glycerol, 1,2,6-hexanetriol, and pentaerythritol; or an alkylene oxide polymer or copolymer such as a block or random copolymer.

A preferred polyoxyalkylene polyol is an alkylene oxide/polyol adduct which has been reacted with an alkylene oxide. A very suitable example of such a polyoxylalkylene polyol is a propylene oxide/glycerol adduct that has been reacted with less than 10% by weight of ethylene oxide based on the weight of adduct and more preferably from 3% to 8% by weight of ethylene oxide.

For the purpose of the present invention, the term alkylene oxide is defined herein as meaning an organic compound containing an epoxy group, and preferably a vic-epoxy group. By vic-epoxy group it is meant that the oxygen is attached to adjacent carbon atoms. Examples of suitable alkylene oxides include, among others, epichlorohydrin, ethylene oxide, 1,1-dimethyl-ethylene oxide, propylene oxide, 1,2-butylene oxide, styrene oxide and cyclohexene oxide. Said alkylene oxide may be either substituted or unsubstituted, and such substituents, if present, being preferably aliphatic hydrocarbon groups such as methyl, ethyl, propyl, butyl and the like. Particularly preferred is 1,2-propylene oxide or a butylene oxide.

The other constituent for preparing the alkylene oxide/polyol adduct is an organic compound containing a plurality of active hydrogen atoms. In general, any such organic compounds are suitable which contain a plurality of active hydrogen atoms as determined by the Zerewitinoff method. The hydrogen atoms of said organic compounds may be activated by any oxygen atom as in a hydroxyl group, a phenol group, or a carboxylic acid group; a basic nitrogen atom as in an amine group, a hydrozine group, an imine group, an amide group, a guanidine group, a sulfonamide group, an urea group or a thiourea group; or a sulfur atom as in a mercaptan, a thiophenol or a thiocarboxylic acid. Examples of such compounds are glycerol, ethylene glycol, butanediol, oxalic acid, triethanolamine, aniline, resorcinol, diethyl malonate, pentaerythritol, sucrose, ethylene diamine and acetamide. Particularly preferred are the aliphatic polyhydroxy compounds having from 2 to 15 carbon atoms.

Suitable condensation products can be prepared, for example, by condensing butene diol or glycerol under known conditions with 1,2-propylene oxide, to give high molecular weight condensation products.

Preferably such condensation products are prepared using a basic catalyst such as, for example, an alkali metal, an alkali metal hydroide or an alkali metal hydroxide; in addition, catalysts described in the specifications of copending U.S. applications Nos. 841,007, filed September 21, 1959, now abandoned; 41,501, filed July 8, 1960, now abandoned; and 56,689, filed September 19, 1960, now abandoned, may be used. In some cases it may be advantageous to prepare the condensation product from more than one such alkylene oxide, e.g., propylene oxide, a butylene oxide or styrene oxide reacted either singly or in admixture, resulting in block copolymers or random copolymers, respectively.

The polyol product is prepared by condensing an organic compound having a plurality of active hydrogen atoms as hereinbefore described with an alkylene oxide, which product may be represented by the general formula:

wherein Y is the residue of the organic compound containing therein $x$ active hydrogen atoms, $x$ is an integer greater than 1, $n$ is the number of moles of alkylene oxide and R is the residue of the alkylene oxide having at least two carbon atoms.

Thus, for example, an organic compound having a plurality of active hydrogen atoms such as glycerine is placed in a reactor together with, if desired, a catalyst such as anhydrous sodium or potassium hydroxide. The alkylene oxide, such as, for example, propylene oxide, is then introduced into the reactor under pressure and the reactor products heated to from 50° C. to 200° C. with from 80° C. to 150° C. being preferred. The amount of alkylene oxide reacted with the organic compound is that quantity which produces a product having a molecular weight of from 500 to 8,000. In other words, the values of $x$ and $n$ in the above formula are such that the molecular weight of the compound is between 500 and 8,000 as determined by hydroxyl number. In general, the reaction may be conducted at atmospheric pressure or at pressures up to, say, 100 p.s.i. The reaction is usually performed under an inert atmosphere such as nitrogen and the caustic catalyst may be neutralized with an acid such as sulfuric acid and the product subsequently filtered.

The preferred type of condensation product is one derived from glycerol, hexanetriol, 1,2,6-trimethylolpropane, pentaerythritol, triisopropylamine or butene diol and propylene oxide and which has a molecular weight as determined by the hydroxyl number from about 500 to 8,000 and preferably from about 2,500 to 5,500.

The condensation product may be then preferably reacted with from 1 to 10 and more preferably from 3 to 8 percent by weight of the alkylene oxide or ethylene oxide to give the polyol especially useful in the process according to the present invention. Although the unreacted alkylene oxide is generally removed before the ethylene oxide is introduced, this is not essential.

In general, the same catalyst and reaction conditions are employed in "tipping" the condensation product prepared above with ethylene oxide as were used in reacting the organic compound with the alkaline oxide to prepare the condensation product. The reaction product which results from such "tipping" with ethylene oxide may be represented by the general formula:

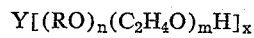

wherein Y is the residue of the organic compound containing therein $x$ active hydrogen atoms, $x$ is an integer greater than 1, $n$ is the number of moles of alkylene oxide, $m$ is the number of moles of ethylene oxide, and R is the residue of the alkylene oxide having at least three carbon atoms. Particularly preferred are those compounds described above wherein Y is a polyvalent hydrocarbon having from 2 to 15 carbon atoms.

Useful polyoxyalkylene polyols may also be obtained by reacting an alkylene oxide with an adduct formed from a primary or secondary amine and a polyepoxide resin; for example, a polyoxyalkylene polyol obtained by reacting an alkylene oxide with an adduct formed from a dialkanolamine and a polyepoxide resin formed from an epihalohydrin and a polyhydric organic compound. Such polyoxyalkylene polyols may be produced from propylene oxide and an adduct formed from diethanolamine and a polyepoxide resin formed from epichlorhydrin and 2,2-bis(4-hydroxyphenyl)propane; the adduct itself being, for example, produced according to British Patent 873,264. Suitable adducts have an average molecular weight between 300 and 6,000, as for example, 500 to 5,500. A rigid or semi-rigid polyurethane may be produced by the present invention if a polyoxyalkylene polyol having an average molecular weight of 500 or less is used.

The polyester having terminal hydroxyl groups may be a conventional polyester containing terminal hydroxyl groups ordinarily used in the production of polyurethane elastomers. For the purposes of the invention, there is included among the polyesters as equivalents thereof, polyether-esters, as, for example, polydiethylene glycol adipate and polyester amides as, for example, polyethylene glycol hexamethylene diamine adipate-adipamide. Examples of the polyesters are compounds obtained by reacting a polyhydric alcohol, as for example, ethylene glycol or glycerol with a polycarboxylic acid, such as, for example, polyethylene adipate, polyethylene sebacate, poly-1,2-propylene adipate, polyethylene and poly-1,2-propylene succinate or an alkyd resin such as a glyceryl phthalate. Suitable polyesters have an average molecular weight between 300 and 6,000, and preferably from about 500 to 5,000. A rigid or semi-rigid polyurethane may be produced by the invention if a polyester having an average molecular weight of 500 or less is used.

The glycidyl ether from which the modified glycidyl ether is derived may be aliphatic or aromatic, and may be formed from an epihalohydrin such as epichlorhydrin and a polyhydric organic compound such as a polyhydric alcohol, as for example, ethylene glycol, glycerol, pentaerythritol, sorbitol or polyallyl alcohol; or a polyhydric phenol, such as, for example, resorcinol, hydroquinone, 2,2-bis(4-hydroxyphenyl)propane or 1,5-dihydroxy naphthalene. A preferred glycidyl ether used to form the modified glycidyl ether is formed from epichlorhydrin and glycerol by, for example, the processes disclosed in United States Patents 2,541,027 and 2,500,449. This preferred glycidyl ether is liquid; and has an average molecular weight of about 324 and an epoxide equivalent within the range 140–165. The hydroxyamine from which the modified glycidyl ether is derived is a primary or secondary amine; but it is preferably a secondary amine because of undesirable side reactions that occur between the glycidyl ether and the primary amine. Some suitable hydroxyamines are: hydroxyaliphatic amines; bis(hydroxyaliphatic)amines; N-hydroxyaliphatic-N-aliphaticamines; N-hydroxyaliphatic-N-aryl amines; hydroxyaryl amines; bis(hydroxyaryl)amines; N-hydroxyaryl-N-aliphaticamines; N-hydroxyaryl-N-arylamines; and N - hydroxyaliphatic - N - hydroxyaryl amines. Others amines suitable to produce modified glycidyl ethers are disclosed in British Patent 873,264. Preferred hydroxyamines are bis(hydroxyaliphatic)amines as for example, bis(hydroxyalykyl)amines. Particularly preferred bis-(hydroxyalkyl)amines for the production of the modified glycidyl ether are diethanolamine and bis(2-methyl-2-hydroxyethyl)amine.

The modified glycidyl ether may is a solid, be produced by either a fusion process or a solvent process. An example of the fusion process is where one mole of glycidyl ether is heated in a vessel fitted with a sealed stirrer, thermometer and reflux condenser; and two moles of the hydroxyamine are quickly added (if the original glycidyl ether is solid, the hydroxyamine is added when the glycidyl ether is just molten). The resulting mixture is heated for two hours or so; then it is poured into a metal tray, and the cooled product pulverized. Because the reaction between the glycidyl ether and hydroxyamine is exothermic, the temperature should be carefully controlled during the process to avoid overheating. An example of the solvent process is where one mole of glycidyl ether is added portionwise over a half hour to a hot solvent, such as ketones, esters, and aromatic hydrocarbons, or mixture of solvents contained in a Dean and Stark apparatus that has been fitted with a thermometer. Two moles of the hydroxyamine are then quickly added, and the mixture is heated for three hours or so at, for example, 115° C. On cooling the modified glycidyl may be filtered off. The modified glycidyl ether may, if a liquid, be produced by mixing liquid glycidyl ether with hydroxyamine and allowing them to react with one another. Suitable modified glycidyl ethers may also be produced according to British Patent 873,264.

In the production of the polyurethane resins, the starting materials may be mixed together in suitable proportions, and the reaction may be allowed to proceed either to a desired viscosity of the reaction mixture or to a desired isocyanate or isothiocyanate content thereof. The reaction proceeds smoothly, and is readily controllable; and if desired, it may be performed at an elevated temperature as for example, 80–90° C., under an atmosphere of a dry inert gas, such as hydrogen or carbon dioxide and, if desired, under reduced pressure. If desired, the organic polyisocyanate or polyisothiocyanate may be added stepwise to the reaction mixture so as to promote the formation of long chains in the polyurethane resin; for example half of the total amount or less of the organic polyisocyanate or polyisothiocyanate may be added to a mixture of the polyoxyalkylene polyol or polyester having terminal hydroxyl groups and the modified glycidyl ether, and the remainder of the organic polyisocyanate of polyisothiocyanate added when the mixture has reacted to a suitable viscosity. The process may be performed under substantially anhydrous conditions, that is, the water content of the reaction mixture may be about 0.1% by weight of the reaction mixture; so that the reaction essentially proceeds between the reactive hydrogen atoms of the polyoxyalkylene or polyester compound and the isocyanato groups of the organic polyisocyanate or the isothiocyanato groups of the organic polyisothiocyanate.

If the polyurethane resin contains free isocyanato or free isothiocyanato groups, a stabilizing amount of a primary or secondary amine that is sufficient to furnish at least one nitrogen atom bearing a hydrogen atom for each unreacted isocyanato or isothiocyanato group may be added to obtain a polyurethane resin containing no free isocyanato or isothiocyanato groups.

When a molecular excess of organic polyisocyanate or polyisothiocyanate over the polyoxyalkylene polyol or the polyester having terminal hydroxyl groups is used, a polyurethane resin having terminal isocyanato or isothiocyanato groups is formed. The amount of organic polyisocyanate or polyisothiocyanate used is a major factor that determines the chain length of the polyurethane resin. Thus, when the amount of the organic polyisocyanate or polyisothiocyanate is only slightly more than one mole per mole of polyoxyalkylene polyol or polyester having terminal hydroxyl groups, there will be a greater chain length in the polyurethane resin; and when the amount of the organic polyisocyanate or polyisothiocyanate is greater than 3 moles per mole of polyoxyalkylene polyol or polyester having terminal hydroxyl groups, the chain length in the polyurethane resin will be shorter. The physical characteristics of the polyurethane resins, and polyurethane plastics obtained therefrom are, inter alia, determined by the molecular weights, structures, and proportions of the reactants. The amount of the organic polyisocyanate or polyisothiocyanate used may be varied according to whether the polyurethane resin to be produced is to be pressed in a heated mold to give a rubberlike product, or cast into sheet form.

The polyurethane resin may be used in lacquers, varnishes or paints; converted into a synthetic rubber by heating it in the presence of a basic catalyst and/or a surface active agent; or it may be converted into a polyurethane plastic by heating it with a compound containing active hydrogen atoms in the optional presence of a basic catalyst and/or a surface active agent, as for example, a silicone oil. The present invention includes such a synthetic rubber and polyurethane plastic. The basic catalyst may be: an organic base, as for example, calcium oxide, calcium hydroxide, barium oxide, barium hydroxide or sodium methoxide or potassium ethoxide; or a tertiary organic base, such as, for example, trimethylamine, triethylamine, tripropylamine, triamylamine, tribenzylamine, 1,4-diazabicyclo(2,2,2)octane, dimethylaniline or an N-alkyl-morpholine. The amount of basic catalyst used is preferably from about 0.05 to 1.0% by weight based on the weight of the polyurethane resin.

Compounds containing active hydrogen atoms are preferably difunctional or trifunctional compounds, which preferably have relatively low melting points, say, below 150° C. in order to facilitate mixing. Suitable difunctional compounds include water; glycols, such as ethylene glycol, 1,3-propane diol, 1,4-butane diol, and 1,4-butene diols; primary or secondary amines such as ethylene diamine, trimethylene diamine, tetramethylene diamine, m-phenylene diamine, naphthalene diamines, toluene-2,4-diamine, aminobenzylaniline, and aminodiphenylamine; dicarboxylic acids such as succinic acid; hydroxyamines, such as, for example, 2-amino-ethyl alcohol, 2-amino-1-hydroxy-naphthalene, m-amino-phenyl; hydroxycarboxylic acid such as glycollic acid and alpha-hydroxy-propionic acid; and amino-carboxylic acids such as, for example, amino-acetic acid and aminobenzoic acid. A suitable trifunctional compound is glycerol.

According to another feature of the invention, there is provided a process for the production of the polyurethane plastic, wherein the polyurethane resin containing free isocyanato or isothiocyanato groups is reacted with a compound containing active hydrogen atoms. The present invention also includes the resulting polyurethane plastics, together with those polyurethane plastics formed under conditions whereby carbon dioxide or carbon oxysulfide is evolved during the reaction with the compound containing active hydrogen atoms to produce a cellular structure in the resulting polyurethane plastic. If desired, this blowing action by the carbon dioxide or carbon oxysulfide evolved may be supplemented by the use of a volatile halohydrocarbon, such as, for example, a fluorochlorohydrocarbon like trichlorofluoromethane. If a liquid volatile halohydrocarbon is added to the reaction mixture for the production of a polyurethane plastic, the heat evolved during the formation of the polyurethane plastic is sufficient to vaporize the halohydrocarbon. The blowing may also be assisted or effected by mechanical admixtures of an inert gas.

If desired, the polyurethane plastic may be produced in a one-stage process by a process wherein the organic polyisocyanate or polyisothiocyanate is reacted with the polyoxyalkylene polyol or polyester having terminal hydroxyl groups in the presence of the modified glycidyl ether and a compound containing active hydrogen atoms. If desired, the ratio of total isocyanato or isothiocyanato groups to total hydroxyl groups present in the reaction mixture may be substantially equal to or greater than 1:1. The invention also includes the polyurethane plastics produced by the process.

If desired, the one-stage process for the production of a polyurethane plastic may be performed in the presence of an organic tin catalyst such as, for example, dibutyl tin dilaurate, stannous 2-ethyl-1-hexoate or a tin salt of a synthetic acid such as the tin salts of the so-called Koch acids, and/or a basic catalyst such as, for example, a tertiary organic amine like trimethylamine, triethylamine, tripropylamine, 1,4-diazabicyclo(2,2,2)octane, dimethyl aniline or an N-alkylmorpholine; and/or a surface active agent such as a silicon oil and/or a solvent such as for example, benzene, toluene, xylene, gasoline, carbon tetrachloride, ethyl acetate, amyl acetate or solvent naphtha and/or a filler. The amount of organic tin catalyst added may be within the range 0.01% to 1.0% by weight based on the weight of the polyoxyalkylene polyol or polyester having terminal hydroxyl groups. The amount of basic surface active agent added may be within the range 0.1% to 3.0% by weight based on the weight of the polyoxylalkylene polyol. If desired, a volatile halohydrocarbon such as, for example, a fluorohydrocarbon or a chlorofluorohydrocarbon may also be added to the reaction mixture, the heat evolved during the formation of the polyurethane plastic being sufficient to vaporize the halohydrocarbon. An inert gas may also be admixed with the reaction mixture.

The one-stage production of a polyurethane plastic of the invention may be performed under such conditions that carbon dioxide or carbon oxysulfide is evolved during the reaction to produce a cellular structure in the resulting polyurethane plastic. Rigid, semi-rigid or flexible polyurethane foams may thereby be obtained. Such foams have good surfaces that are not friable, and do not suffer from shrinkage. The use of the modified glycidyl ether in the one-stage production of a polyurethane plastic promotes dispersion of the starting materials, accelerates the reaction, and gives polyurethane plastics having high load bearing properties, good shock absorbing characteristics, good moldability, and good bottom mold release properties.

Additives, particularly light stabilizers and/or antioxidants and also, if desired, fillers and/or pigments of various kinds can be incorporated in the mixture of the reactants used for preparing foamed polyurethane plastics in accordance with the present invention.

If desired, the polyurethane resin may be prepared in the presence of an organic solvent such as benzene, toluene, xylene, solvent naphtha, gasoline, carbon tetrachloride, ethyl acetate or amyl acetate. A film of the resulting solution may then be exposed to atmospheric moisture or reacted with an organic compound containing active hydrogen to form a substantially bubble-free polyurethane plastic sheet.

Advantages of the invention are illustrated by the following examples. The reactants, and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

*Example I*

One hundred parts of a polyoxyalkylene polyol formed from propylene oxide and glycerol and having an average molecular weight of 539 were mixed with 7.5 parts of a glycidyl ether formed from epichlorhydrin and glycerol and having an average molecular weight of 324, and an epoxide equivalent within the range 140–165, and further modified by reaction with diethanolamine. The resultant mixture was then mixed with 128.4 parts of bis(4-isocyanatophenyl)-methane, and a mixture comprising 3 parts of water, 0.4 part of 1,4-diaza-bicyclo-(2,2,2) octane, and 1 part of a silicone oil (XL 520) (a polysiloxanepolyalkylene block copolymer prepared in accordance with the disclosure in U.S. Patent No. 2,834,748). A rigid polyurethane foam was thereby obtained. This foam had a density of 2.8 lb./cu. ft., and a compression strength of 53 p.s.i.

*Example II*

One hundred parts of a polyoxyalkylene polyol formed from propylene oxide and glycerol having an average molecular weight of 539 were mixed with 10 parts of a glycidyl ether which was formed from epichlorhydrin and glycerol and having an average molecular weight of 324, and an epoxide equivalent within the range 140–165, and further modified by reaction with diethanolamine. The resultant mixture was then mixed with 126 parts of bis(4-isocyanatophenyl)methane, and a mixture comprising 3 parts of water, 0.2 part of 1,4-diazabicyclo-(2,2,2) octane, and 1 part of a silicone oil, (XL 520). A rigid polyurethane foam was thereby obtained, having a density of 3.1 lb./cu. ft. and a compression strength of 56 p.s.i.

*Example III*

One hundred parts of a polyoxyalkylene polyol formed from propylene oxide and glycerol having an average molecular weight of 539 were mixed with 5 parts of a glycidyl ether formed from epichlorhydrin and glycerol and having an average molecular weight of 324, and an epoxide equivalent within the range 140–165 and modified by reaction with diethanolamine. The resultant mixture was then mixed with 118.6 parts of bis(4-isocyanatophenyl)methane, and a mixture comprising 3 parts of water, 0.4 part of 1,4-diaza-bicyclo-(2,2,2) octane, and 1 part of a silicone oil (XL 520). A rigid polyurethane foam was thereby obtained having a density of 2.9 lb./cu. ft. and a compression strength of 49 p.s.i.

*Example IV*

One hundred parts of a polyoxyalkylene polyol having an average molecular weight of 5,000 and formed by reacting an adduct formed from propylene oxide and glycerol with 3% by weight of ethylene oxide based on the weight of the adduct were mixed with 5 parts of a glycidyl ether formed from epichlorhydrin and glycerol and having an average molecular weight of 324, and an epoxide equivalent within the range 140–165 that had been modified by reaction with diethanolamine, and 1.1 parts of a silicone oil (XL 520). The resultant mixture was then mixed with 71.3 parts of bis(4-isocyanatophenyl)methane, and a mixture comprising 3.5 parts of water, 0.4 part of 1,4-diaza-bicyclo(2,2,2)octane, 1.1 parts of a silicone oil (XL 520), and 0.5 part of stannous 2-ethylhexoate. A semi-rigid polyurethane foam was thereby obtained having a density of 5.1 lb./cu. ft., a tensile strength of 12 p.s.i., an elongation of 50%, and a compression strength of 3.75 p.s.i.

*Example V*

One hundred parts of a polyoxyalkylene polyol having an average weight of 3,000 and formed by reacting an adduct formed from propylene oxide and glycerol with 3% by weight of ethylene oxide based on the weight of the adduct were mixed with 5 parts of a glycidyl ether formed from epichlorhydrin and glycerol and having an average molecular weight of 324, and an epoxide equivalent within the range 140–165 and further modified by reaction with diethanolamine, and 1.1 parts of a silicone oil (XL 520). The resultant mixture was then mixed with 75.2 parts of bis(4-isocyanatophenyl)methane, and a mixture comprising 3.5 parts of water, 0.4 part of 1,4-diazabicyclo(2,2,2)octane, 1.1 parts of a silicone oil (XL 520), and 0.5 part of stannous 2-ethyl-hexoate. A semi-rigid polyurethane foam was thereby obtained possessing a density of 4.8 lb./cu. ft., a tensile strength of 12 p.s.i., an elongation of 51%, and a compression strength of 2.5 p.s.i.

*Example VI*

One hundred parts of a polyoxyalkylene polyol having an average molecular weight of 5,000 that had been formed by reacting an adduct formed from propylene oxide and glycerol with 3% by weight of ethylene oxide based on the weight of the adduct were mixed with 5 parts of a glycidyl ether formed from epichlorhydrin and glycerol and having an average molecular weight of 324, and an epoxide equivalent within the range 140–165 and modified by reaction with diethanolamine, and 1.1 parts of a silicone oil (XL 520). The resultant mixture was then mixed with 58.9 parts of bis(4-isocyanatophenyl)methane, and a mixture comprising 3.5 parts of water, 0.4 part of 1,4-diaza-bicyclo(2,2,2)octane, 1.1 parts of a silicone oil (XL 520), and 0.5 part of stannous 2-ethyl-hexoate. A semi-rigid polyurethane foam was thereby obtained having a density of 4.8 lb./cu. ft., a tensile strength of 9.6 p.s.i., an elongation of 45%, and a compression strength of 2.9 p.s.i.

*Example VII*

One hundred parts of a polyoxyalkylene polyol formed from propylene oxide and glycerol having a molecular weight of 3000 that had been formed by reacting an adduct formed from propylene oxide and glycerol with 3% by weight of ethylene oxide based on the weight of the adduct were mixed with 5 parts of a glycidyl ether formed from epichlorhydrin and glycerol and having an average molecular weight of 324, and an epoxide equivalent within the range 140–165 and further modified by reaction with triethanolamine, and 1.1 parts of a silicone oil (XL 520). The resultant mixture was then mixed with 64 parts of bis(4-isocyanatophenyl)methane, and a mixture comprising 3.5 parts of water, 0.4 part of 1,4-diazabicyclo(2,2,2)octane, 1.1 parts of a silicone oil (XL 520), and 0.5 part of stannous 2-ethyl-hexoate. A semi-rigid polyurethane foam was obtained having a density of 5.3 lb./cu. ft., a tensile strength of 6.7 p.s.i., an elongation of 38.8%, and a compression strength of 2.75 p.s.i.

*Example VIII*

One hundred parts of a polyoxyalkylene polyol having an average molecular weight of 5,000 that had been formed by reacting an adduct formed from propylene oxide and glycerol with 3% by weight of ethylene oxide based on the weight of the adduct were mixed with 5 parts of a glycidyl ether formed from epichlorhydrin and glycerol and having an average molecular weight of 324, and an epoxide equivalent within the range 140–165 and further modified by reaction with diethanolamine, and 1.0 part of a silicone oil (XL 520). The resultant mixture was then mixed with 43.3 parts of a 4:1 mixture of toluene-2,4-diisocyanate and toluene-2,6-diisocyanate, and a mixture comprising 3.0 parts of water, 0.02 part of 1,4-diaza-bicyclo(2,2,2)octane, and 0.2 part of stannous 2-ethyl-hexoate. A rigid foam was obtained possessing a density of 3.1 lb./cu. ft., a tensile strength of 16.4 p.s.i., an elongation of 102%, a compression strength of 0.87 p.s.i., and a hysteresis of 30.4.

*Example IX*

Example I is essentially repeated except that the polyoxyalkylene polyol is formed by reacting 1,2-butylene oxide with glycerol and then reacting this adduct with 3% by weight of ethylene oxide. Related results are obtained.

*Example X*

A resinous glycidyl ether having a softening point of 100° C. as determined by Durran's Mercury Method, a molecular weight of 1133 measured ebullioscopically in dioxane, and an epoxide equivalency of 1.32 epoxide groups per molecule is prepared from 4 moles of 2,2-bis(4-hydroxyphenyl)propane and 5 moles of epichlorhydrin in a 10% aqueous solution of sodium hydroxide (6.43 moles). This glycidyl ether is then reacted with bis(2-methyl-2-hydroxyethyl)amine to form a modified glycidyl ether.

One hundred parts of a polyoxyalkylene polyol formed from propylene oxide and glycerol and having an average molecular weight of 5,000 is mixed with 10 parts of the previously prepared modified glycidyl ether and 1.0 part of a silicone oil (XL 520). The resultant mixture is then mixed wtih 45 parts of a 4:1 mixture of tolylene-2,4-diisocyanate and tolylene-2,6-diisocyanate, and a mixture comprising 3.0 parts of water, 0.2 part of stannous 2-ethyl-hexoate. A rigid foam is obtained which has excellent bottom mold release properties and exhibits no observable shrinkage. The foam appears less friable than other polyurethane foams.

*Example XI*

The procedure of Example X is essentially repeated wherein the organic polyfunctional compound is propylene-1,2-diisothiocyanate. Related results are obtained.

*Example XII*

The procedure of Example I is substantially repeated except that the polyoxyalkylene polyol is replaced with an equivalent amount of polyethylene adipate having a molecular weight of about 4500. A foam having good moldability and mold release properties as well as high load bearing properties is thereby obtained.

We claim as our invention:

1. A polyurethane resin comprising the reaction product of (1) an organic polyfunctional compound selected from the group consisting of polyisocyanates and polyisothiocyanates, (2) a compound selected from the group consisting of polyoxyalkylene polyols and polyesters having terminal hydroxyl groups and (3) an adduct of (A) a glycidyl ether prepared by reacting epichlorohydrin with a polyhydric organic compound selected from the group consisting of polyhydric alcohols and polyhydric phenols and (B) a bis(hydroxyalkyl)amine.

2. A polyurethane plastic prepared by reacting the polyurethane resin of claim 1 wherein a molecular excess of (1) was used over (2) with an organic compound containing active hydrogen atoms as determined by the Zerewitinoff method and having a melting point below 150° C.

3. A polyurethane resin comprising the reaction product of (1) an organic diisocyanate, (2) a polyoxyalkylene polyol and (3) an adduct of (A) a glycidyl ether prepared by reacting epichlorohydrin with a polyhydric organic compound selected from the group consisting of polyhydric alcohols and polyhydric phenols and (B) a bis(hydroxyalkyl)amine.

4. A polyurethane resin comprising the reaction product of (1) an organic diisocyanate, (2) a polyoxyalkylene polyol which is a condensation product of propylene oxide and glycerol that has been further reacted with less than 10% by weight of ethylene oxide based on the weight of the condensation product and (3) an adduct of (A) a glycidyl ether prepared by reacting epichlorohydrin and glycerol and (B) a bis(hydroxyalkyl)amine.

5. A polyurethane resin as in claim 4 wherein the organic diisocyanate is a tolylene diisocyanate.

6. A polyurethane resin as in claim 4 wherein the organic diisocyanate is bis(4-isocyanatophenyl)methane.

7. A polyurethane resin as in claim 4 wherein the bis(hydroxyalkyl)amine is diethanolamine.

8. A polyurethane resin as in claim 4 wherein the bis(hydroxyalkyl)amine is bis(2-methyl-2-hydroxyethyl)-amine.

9. A polyurethane resin comprising the reaction product of (1) an organic diisocyanate, (2) a polyoxyalkylene polyol which is a condensation product of propylene oxide and glycerol that has been further reacted with less than 10% by weight of ethylene oxide based on the weight of the condensation product and (3) an adduct of (A) a glycidyl ether prepared by reacting epichlorohydrin and 2,2-bis(4-hydroxyphenyl)propane and (B) diethanolamine.

10. A polyurethane resin comprising the reaction product of (1) an organic diisocyanate, (2) a polyoxyalkylene polyol which is a condensation product of propylene oxide and glycerol that has been further reacted with less than 10% by weight of ethylene oxide based on the weight of the condensation product and (3) an adduct of (A) a glycidyl ether prepared by reacting epichlorohydrin and 2,2-bis(4-hydroxyphenyl)propane and (B) bis(2-methyl-2-hydroxyethyl)amine.

11. A process for preparing polyurethane resins which comprises reacting under substantially anhydrous conditions (1) an organic polyisocyanate, (2) a polyoxyalkylene polyol which is condensation product of propylene oxide and glycerol that has been further reacted with less than 10% by weight of ethylene oxide based on the weight of the condensation product and (3) an adduct of (A) a glycidyl ether prepared by reacting epichlorohydrin with a member of the group consisting of glycerol and 2,2-bis(4-hydroxyphenyl)propane and (B) a bis(hydroxyalkyl)amine.

12. A process as in claim 11 wherein the bis(hydroxyalkyl)-amine is diethanolamine.

13. A process for the production of a polyurethane plastic which comprises reacting (1) an organic polyisocyanate, (2) a polyoxyalkylene polyol which is a condensation product of propylene oxide and glycerol that has been further reacted with less than 10% by weight of ethylene oxide based on the weight of the condensation product and (3) an organic compound containing active hydrogen atoms as determined by the Zerewitinoff method, and having a melting point below 150° C. and (4) an adduct of (A) a glycidyl ether prepared by reacting epichlorohydrin with a member of the group consisting of glycerol and 2,2-bis-(4-hydroxyphenyl)propane and (B) a bis(hydroxyalkyl)amine.

References Cited by the Examiner

UNITED STATES PATENTS 3,047,540  7/1962  Merten et al. _____ 260—2.5

FOREIGN PATENTS 873,264  7/1961  Great Britain.

LEON J. BERCOVITZ, *Primary Examiner.*

D. E. CZAJA, *Assistant Examiner.*